March 24, 1925.

J. PARCELL 1,530,910

CONFECTION APPARATUS

Filed Jan. 21, 1924

INVENTOR
John Parcell
BY J. O. Fowler
ATTORNEY

March 24, 1925.
J. PARCELL
1,530,910
CONFECTION APPARATUS
Filed Jan. 21, 1924　　2 Sheets-Sheet 2
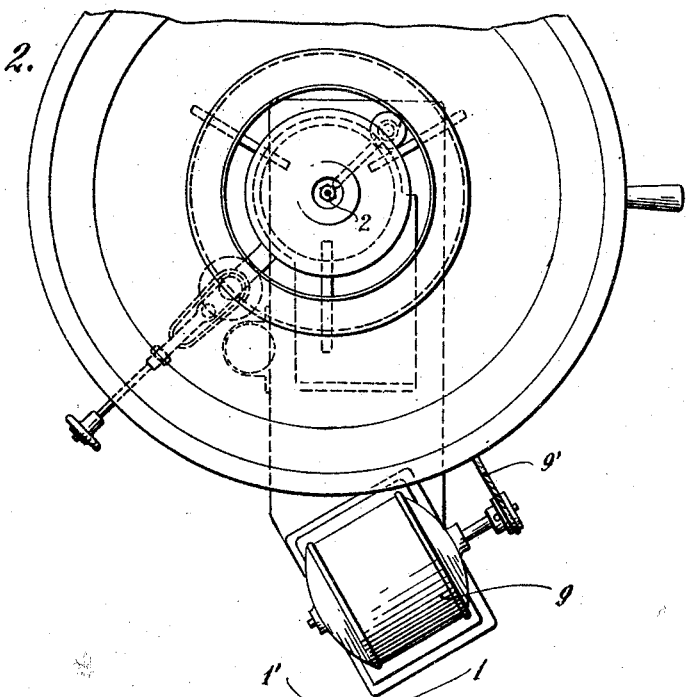
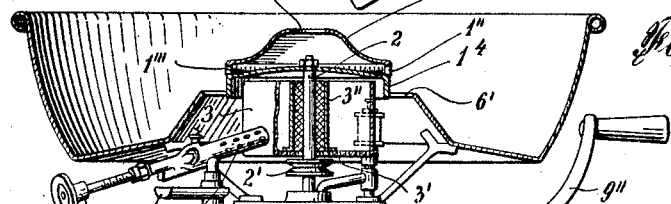
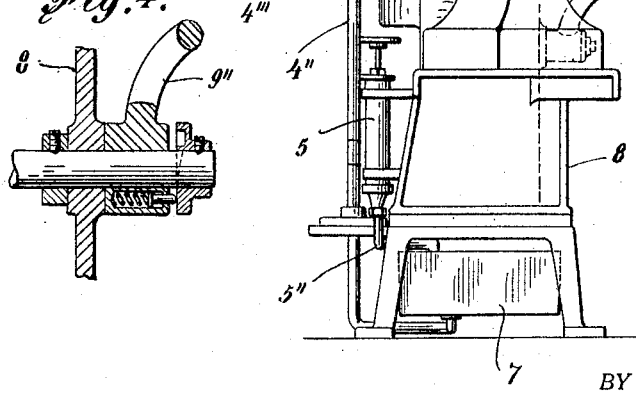
INVENTOR
John Parcell
BY
J. O. Fowler
ATTORNEY Patented Mar. 24, 1925.

1,530,910

UNITED STATES PATENT OFFICE.

JOHN PARCELL, OF NEW YORK, N. Y.

CONFECTION APPARATUS.

Application filed January 21, 1924. Serial No. 687,637.

*To all whom it may concern:*

Be it known that I, JOHN PARCELL, a citizen of the United States, and resident of New York, in the county of New York and State of New York, have invented a certain new and useful Confection Apparatus, of which the following is a specification, the same being a full, clear, and exact description of the invention, such as will enable others skilled in the art to which it appertains to make and use the same.

This invention relates to devices for making candy, sweetmeats, confectionery, and the like; and in particular to apparatus having for its object the production from sugar of what is known as floss candy comprising thin flat strips of ribbon-like, glossy appearance which are caught and held in a suitable container or receptacle from which the multiple strands or funicular mass of fluffy floss may be removed for sale at will.

Another object of the invention is the provision of an improved heating means—in the present embodiment a stove—for rapidly heating and melting the sugar.

Another object of the invention is to provide an improved device for the rapid rotation of a spinning bowl having peripheral slits through which the therein contained melted sugar may be expelled by centrifugal force and thereby spun in thin strips forming a finely divided sequacious mass; and also to furnish improved means for catching and holding the said expelled product.

Another object of the invention is the production of a forced draft or blast burner, a tank to contain gasoline or like inflammable material connected therewith, and means for supplying air under pressure to the same.

A still further object of the invention is the provision of a device of the class described which shall be simple in construction, inexpensive to manufacture, efficient in practical use, and durable in operation.

With these objects, and other objects and purposes which will be described below, in view, the invention consists in the construction, arrangement, combination and operation of parts hereinafter set forth.

In the drawings, illustrative of one embodiment of the invention, which accompany and form a part of this specification, Figure 1 represents a machine constructed according to my invention;

Figure 2 is a plan view of the same;

Figure 3 is another elevation partly in section;

Figure 4 is a view in detail of the crank; and

Figure 1:
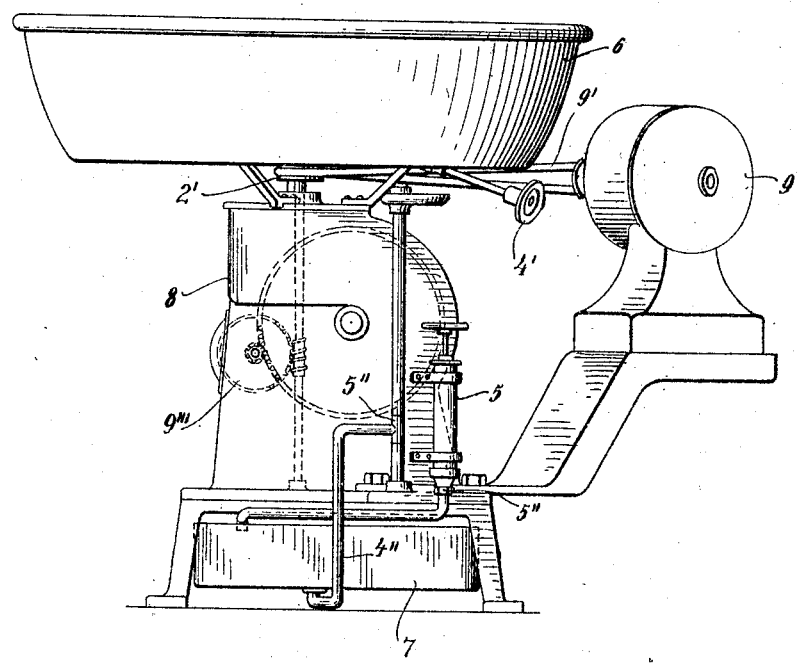
Figure 5:
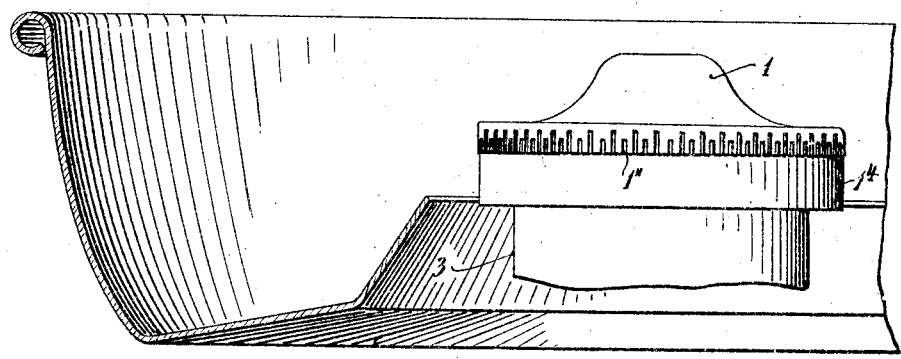
Figure 5 is a partial sectional view of the pan and spinning bowl.

Referring more in detail to the drawings, the numeral 1 denotes my spinning bowl by the rapid rotation of which the floss candy is produced. The said bowl has an open mouth portion 1', a closed concavo-convex bottom plate 1''' and an intermediate peripheral rim having slits 1'' formed in the same, together with a depending annular flange $1^4$ which extends around a therebelow fixed stove 3; the plate 1''' lying a short distance above the top of the stove and the lower edge of the said flange being positioned below the top edge of the stove to allow the escape of heated air and to serve as a protection of the floss candy as it is spun out through the said slits.

The spinning bowl is fixedly secured on a rotary tube 2 supported by the casing 8 and is provided with a pulley 2'. The stove 3, which is preferably spun from one piece of metal, has an open top and a perforated bottom 3' to admit air, and also a central tube 3'' lined on the interior thereof with a heat resisting material—as asbestos—to protect the tube 2 which passes through the same. In the side wall of the stove and near the bottom thereof a perforation is made through which the Bunsen burner 4 is passed having an adjusting valve 4' and a feed pipe 4'' through which the combustible element—as gasoline—flows.

The flame is projected under pressure through the stove wall and against the central tube thereof and is spread out and impinges the lower part of the spinning bowl. Surrounding the latter and enclosing the same is a stationary pan 6 mounted on the casing of the apparatus, the said pan being recessed at its lower part and having an open portion of greater diameter than those of the spinning bowl and stove, the height of the pan being preferably such as to extend from the plane of the bottom of the stove to a short distance above the plane of the top of the spinning bowl.

I employ a superheated gasoline burner which is operated in the following manner:—The valve 4' is first opened sufficiently to allow gasoline to fill the priming cup 4''' located below the same and then closed, which gasoline, when ignited, heats the burner, and upon opening the valve again the flame is forced through the nozzle (which has air orifices) and produces a bright blue, clear smokeless and intensely hot flame that cannot be extinguished even in a strong wind, the said intensity of the flame being regulated by manually operating the handle of the valve. Alcohol may be used in the priming cup if desired.

The forced draft is created by the use of an air pump 5 and an air pipe 5″ communicating with the upper part of a gasoline tank 7 which is located in the lower portion or base of the casing 8. The pipe 4″ runs from the bottom of the tank to the burner to feed the latter with gasoline under air pressure.

The air pump may have the ordinary check valve to prevent the escape of air from the tank and to permit air to pass through the ball check valve into the tank.

The apparatus may be driven by the use of an electric motor 9 connected by a belt 9′ with the pulley 2′ or driven manually by a crank 9″ whereby the tube 2 may be rotated.

In operation, ordinary granulated sugar is placed in the spinning bowl through the open mouth thereof, which sugar is melted by the heat of the burner and ejected through the slits in the form of floss candy by centrifugal force generated by the rapid rotation of the spinning bowl either manually or by the electric motor, which product is caught and retained by the pan until removed for sale.

I wish it to be understood that I do not desire to be limited to the particular use or the exact details of construction shown and described, for obvious modifications will occur to persons skilled in the art.

What I claim as my invention is:—

1. In a device of the class described, a spinning bowl having peripheral slits, a supporting pipe fixed thereto a therebelow stove having a tube with a heat resisting lining to enclose the said pipe and a perforated bottom portion, a burner for the stove, a stationary pan surrounding and enclosing the stove and spinning bowl, and means to rotate the latter.

2. In a device of the class described, a spinning bowl having slits, and a depending flange, a support therefor, a therebelow stove the top edge of which lies within the said flange and having a tube with a heat resisting lining to enclose the support for said bowl and a perforated bottom, a burner for the stove, a pan enclosing the stove and spinning bowl, and means to rotate the latter.

3. In a device of the class described, a spinning bowl having slits and made with an open top, a closed bottom portion and a depending annular flange, a supporting pipe fixed thereto, a therebelow stove having a tube with a heat resisting lining to enclose the said pipe and a perforated bottom portion, a burner for the stove, a pan enclosing the stove and spinning bowl and having an open recessed bottom portion and extending in height from the plane of the bottom of the stove over the plane of the top of the spinning bowl, and means to rotate the latter.

Signed at New York, in the county of New York and State of New York, this 27th day of December A. D. 1923.

JOHN PARCELL.